United States Patent
Wang et al.

(10) Patent No.: US 12,502,769 B2
(45) Date of Patent: Dec. 23, 2025

(54) METHOD FOR FOOT/GROUND CONTACT DETECTION FOR ROBOT, ROBOT AND COMPUTER-READABLE MEDIUM

(71) Applicant: UBTECH ROBOTICS CORP LTD, Shenzhen (CN)

(72) Inventors: Jiajun Wang, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 275 days.

(21) Appl. No.: 18/236,395

(22) Filed: Aug. 21, 2023

(65) Prior Publication Data

US 2023/0398684 A1 Dec. 14, 2023

Related U.S. Application Data

(63) Continuation of application No. PCT/CN2021/132112, filed on Nov. 22, 2021.

(30) Foreign Application Priority Data

Feb. 24, 2021 (CN) .......................... 202110209706.9

(51) Int. Cl.
- *B25J 9/16* (2006.01)
- *B25J 13/08* (2006.01)
- *G05B 19/4155* (2006.01)

(52) U.S. Cl.
CPC ........... *B25J 9/1628* (2013.01); *B25J 9/1607* (2013.01); *B25J 13/085* (2013.01); *G05B 19/4155* (2013.01); *G05B 2219/50391* (2013.01)

(58) Field of Classification Search
CPC ...... B25J 9/1664; B25J 9/0006; B25J 9/1633; B25J 9/1628; B25J 9/1607; B25J 13/085;
(Continued)

(56) References Cited

U.S. PATENT DOCUMENTS 9,849,004 B2 * 12/2017 Choi ........................ A61F 2/70
2021/0039253 A1 * 2/2021 Whitman ............... B25J 9/1674

FOREIGN PATENT DOCUMENTS

CN 109634100 A 4/2019
CN 110450159 A 11/2019
(Continued)

OTHER PUBLICATIONS

Sahrom SB, Wilkie JC, Nosaka K, Blazevich AJ. The use of yank-time signal as an alternative to identify kinematic events and define phases in human countermovement jumping. R Soc Open Sci. Aug. 26, 2020;7(8): 192093. doi: 10.1098/rsos. 192093. PMID: 32968500; Pmcid: PMC7481710. (Year: 2020).*
(Continued)

*Primary Examiner* — Adam R Mott
*Assistant Examiner* — James Miller Watts, III

(57) ABSTRACT

A method for detecting contact of a swinging leg of a robot with ground includes: obtaining a torque on each joint of the swinging leg when the robot is in a swing phase; estimating a force on a foot of the swinging leg by using a force Jacobian matrix based on the torque on each joint of the swinging leg, and calculating a rate of change of force of the foot in a vertical direction according to the force on the foot; and determining that the swinging leg has contacted the ground in response to a preset consecutive number of values of the rate of change of force being greater than a preset threshold.

20 Claims, 7 Drawing Sheets

(58) Field of Classification Search
CPC .... B25J 9/1679; B25J 9/1656; B25J 17/0258; B25J 18/00; B25J 9/16; B25J 13/08; B25J 17/02; G05B 13/00; G05B 19/4155; G05B 2219/50391; G05D 1/08; B62D 57/028; B62D 57/02; B62D 57/032
See application file for complete search history.

(56) References Cited

FOREIGN PATENT DOCUMENTS

| | | |
|---|---|---|
| CN | 111880544 A | 11/2020 |
| CN | 112000134 A | 11/2020 |
| JP | 2019202406 A | 11/2019 |

OTHER PUBLICATIONS

ISR for PCT/CN2021/132112.
Written opinions of ISA for PCT/CN2021/132112.

* cited by examiner

METHOD FOR FOOT/GROUND CONTACT DETECTION FOR ROBOT, ROBOT AND COMPUTER-READABLE MEDIUM

CROSS REFERENCE TO RELATED APPLICATIONS

The present application is a continuation-application of International Application PCT/CN2021/132112, with an international filing date of Nov. 22, 2021, which claims foreign priority to Chinese Patent Application No. 202110209706.9, filed on Feb. 24, 2021 in the China National Intellectual Property Administration, the contents of all of which are hereby incorporated by reference.

TECHNICAL FIELD

The present disclosure generally relates to legged robots, and particularly to a method for foot/ground contact detection for a legged robot, legged robot, and computer-readable storage medium.

BACKGROUND

During the walking process of a legged robot, timely and correct detection of contact of the foot of a swinging leg with the ground plays a key role in the gait planning and control stability of the legged robot. There are three conventional detection approaches: (1) detecting touching ground signals by using an additional sensor (e.g., a piezoelectric strain gauge) installed on the sole of each foot of a legged robot; (2) monitoring the force on the feet of a legged robot using torque sensors or current based on a residual observer and dynamic information; (3) for a legged robot with light-weighted legs, estimating the plantar force through a static Jacobian matrix. The above-mentioned approaches have drawbacks. First, in practical applications, the configuration of some robots makes it unrealistic to install sensors on the soles of the feet, and additional sensors will increase the manufacturing cost of the robot. Second, the residual observer is more dependent on the accuracy of model parameters, and generally has a certain degree of lag. Finally, when solving the static Jacobian matrix, it is no longer applicable to the scene when the mass of the legs of a legged robot cannot be ignored.

Therefore, there is a need to provide a method for detecting the contact of a swinging leg of a robot with ground to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
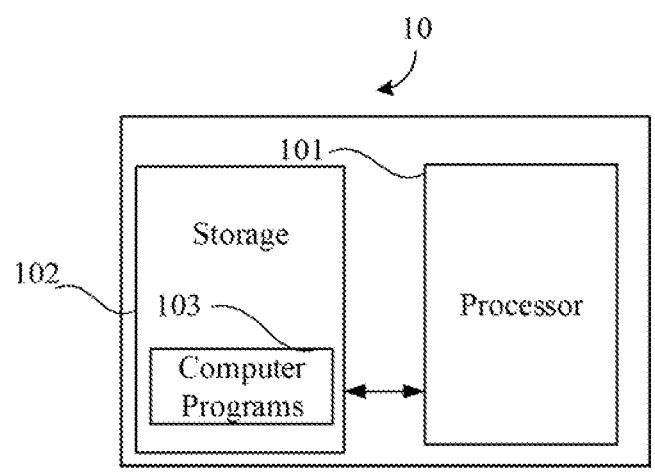
FIG. 1 is a schematic block diagram of a legged robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
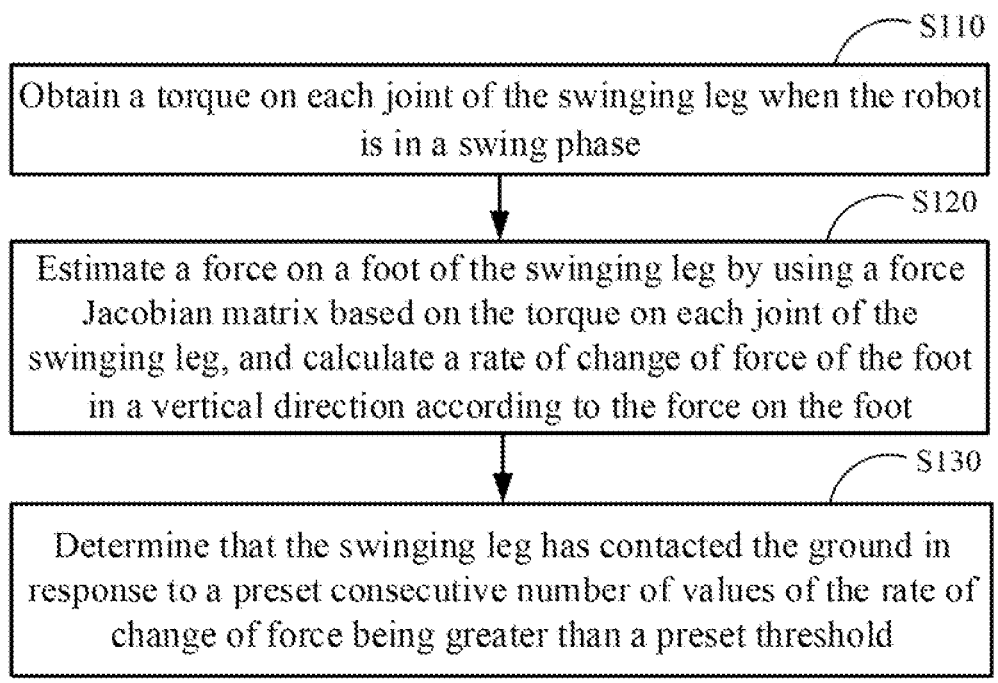
FIG. 2 is an exemplary flowchart of a foot/ground contact detection method according to one embodiment.

FIG. 1 shows a schematic block diagram of a legged robot 10 (e.g., a biped robot) according to one embodiment. The robot 10 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for detecting the contact of a swinging leg of a robot with ground, such as steps S110 to S130 in FIG. 2, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 6:
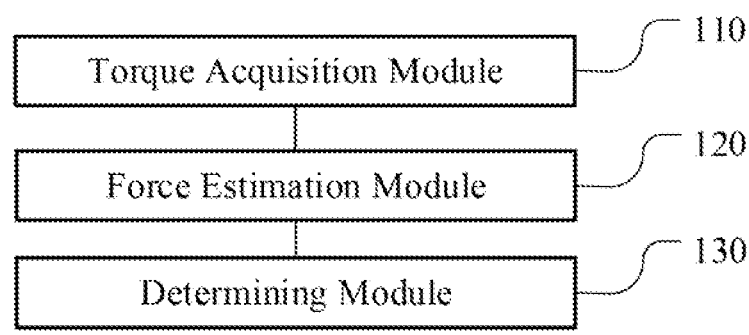
FIG. 6 is schematic block diagram of a foot/ground contact detection device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 103 may be divided into a torque acquisition module 110, a force estimation module 120, and a determining module 130 as shown in FIG. 6.

It should be noted that the block diagram shown in FIG. 1 is only an example of the robot. The robot may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a method for detecting the contact of a swinging leg of the robot 10 with the ground according to one embodiment. As an example, but not a limitation, the method can be implemented by the robot 10. The method may include the following steps.

Step S110: Obtain a torque on each joint of the swinging leg when the robot is in a swing phase.

In one embodiment, the swing phase refers to a period when at least one leg of the robot 10 is in a suspended state without contacting the ground. When the robot 10 is in the swing phase, in order to accurately determine when the swinging leg in the air comes into contact with the ground, the torque acting on each joint of the swinging leg can be obtained, and the force acting on the foot of the swinging leg in Cartesian space (i.e., the working space) can be roughly estimated, so as to use the rate of change in the force on the foot to determine the contact of the foot of the swinging leg with the ground, which can realize timely and efficient detection of the contact of the foot of the swinging leg with the ground.

Generally, legged robots can be divided into two categories, one (e.g., a flat-footed humanoid robots) is equipped with torque sensors at the corresponding positions of the joints; the other is without or cannot install sensors, such as multi-legged robots with point-shaped feet. In one embodiment, for different types of legged robots, different approaches can be used to obtain the torque on each joint of the swinging leg.

In one embodiment, for a robot with a torque sensor on each joint of a leg, the above-mentioned torque may be obtained through a torque sensor on each joint of the swinging leg. For example, in addition to using dedicated torque sensors, six-dimensional sensors for measuring three-dimensional force and three-dimensional torque may be used.

In one embodiment, for a robot without a torque sensor installed on the sole of each foot of the robot, the current of the drive motor running through the corresponding joint of the swinging leg can be used to estimate the torque on the corresponding joint according to a corresponding equation, so as to obtain the torque on all joints of the swinging leg. Exemplarily, the equation for estimating the torque is as follows: $\tau_i = r_i * k_i * l_i$, where $\tau_i$ represents the torque acting on the i-th joint of the swinging leg, $r_i$ represents a reduction ratio of the i-th joint reducer, $k_i$ and $l_i$ represent a torque coefficient and a current of the drive motor for the i-th joint, respectively.

Step S120: Estimate a force on a foot of the swinging leg by using a force Jacobian matrix based on the torque on each joint of the swinging leg, and calculate a rate of change of force of the foot in a vertical direction according to the force on the foot.

Exemplarily, the force on the foot of the swinging leg of the robot in the work space can be roughly estimated through a static Jacobian matrix mapping of the robot. Generally, when the force from the external environment on the foot is known, the force Jacobian matrix can be used to calculate the joint driving torque under the condition of static equilibrium. For this reason, in one embodiment, the force Jacobian matrix is used to estimate the force acting on the foot from the external environment when the torque acting on the joints is known.

In one embodiment, the force Jacobian matrix of the swinging leg can be calculated through the velocity Jacobian matrix of the swinging leg. Then, the force acting on the foot of the swinging leg is calculated by using the force Jacobian matrix and the torque acting on each joint of the swinging leg. For example, the force acting on the foot of the swinging leg can be estimated according to the following equation: $f_c \approx -(J_c^T)^{-1}\tau$, where $f_c$ represents the force acting on the foot of the swinging leg, $J_c$ represents the velocity Jacobian matrix at the point of application of force of the foot of the swinging leg, which reflects the relationship between the velocity of the foot of the swinging leg and the velocity of each joint, $J_c^T$ represents the force Jacobian matrix, which is the transpose of the velocity Jacobian matrix, and $\tau$ represents a column vector consisting of the torques of all joints of the swinging leg.

It can be understood that the calculated force acting on the foot is a generalized force, and it includes three-dimensional forces when there is no torque and it includes three-dimensional forces and torques when there are torques. For example, for a robot with flat feet, the force acting on the foot of the robot is expressed as follows: $f_c = [f_x, f_y, f_z, n_x, n_y, n_z]^T$, where $(f_x, f_y, f_z)$ are the force components in the X, Y, and Z directions, $(f_x, f_y, f_z)$ are the torque components around the X, Y, and Z axes, respectively. However, for a robot with point-shaped feet, the force acting on the foot is expressed as follows: $f_c = [f_x, f_y, f_z]^T$.

It should be noted that the above-mentioned steps are only a rough calculation of the force acting on the foot in the workspace. The full dynamic equation of the swinging leg of the robot is as follows: $M(q)\ddot{q} + C(q,\dot{q}) + G(q) = S\tau + J_c(q)^T f_c$, where q, $\dot{q}$ and $\ddot{q}$ are the positions, velocities and accelerations of the joints of the swinging leg of the robot, respectively; $J_c(q)$ is the velocity Jacobian matrix; r is the torque acting on each joint; M(q) is the inertia matrix of the links of the leg; C(q, $\dot{q}$) is the centrifugal force and Coriolis force matrix; G(q) is the gravitational term composed of the gravity of each link of the swinging leg; S is the selection matrix, which is used to map $\tau$ to the work space, for example, S can be set as the identity matrix I. The following equation can be obtained by transforming the full dynamic equation above: $\tau = M(q)\ddot{q} + C(q, \dot{q}) + G(q) - J_c(q)^T f_c$.

When the swinging leg is light-weighted and the movement speed is slow, $M(q)\ddot{q} + C(q,\dot{q}) + G(q)$ can be ignored. Then, $\tau = -J_c(q)^T f_c$. If the above-mentioned conditions are not satisfied, that is, when the mass of the swinging leg cannot be ignored, or the swinging speed is fast, the force acting on the foot obtained by using the equation will be far from the real value. If the calculated force is used directly, the real force on the swinging leg cannot be obtained. However, the rate of change in the force on the foot (i.e., the rate of change of force) can still be reflected by this rough calculation equation.

In one embodiment, for the foot/ground detection task, only the rate of change of force in the direction of gravity (i.e., vertical direction) is concerned. For the step S120 above, after the force acting on the foot of the swinging leg is estimated, the rate of change of force of the swinging leg in the vertical direction will be calculated. The direction of gravity can be understood as the heightwise direction of the swinging leg when it is moving, and generally, the Z-axis direction in the world coordinate system can be used as the direction of gravity.

In one embodiment, the rate of change in a resultant force of the foot of the swinging leg at the current moment is calculated based on the force on the foot at a previous moment and the current moment, and the component of the rate of change in the resultant force in the vertical direction is determined as the rate of change of force of the foot in the vertical direction. If the direction of gravity coincides with the Z-axis direction, the rate of change of the force is the component in the Z-axis direction. At this time, the equation for calculating the rate of change of the resultant force is as follows:

$$\dot{f}_c = \frac{f_c - f_c^-}{\Delta t},$$

where $\dot{f}$ is the rate of change of the resultant force; $f_c$ is the force acting on the foot at the current moment; $f_c^-$ is the force acting on the foot at the previous moment; $\Delta t$ is the unit duration, that is, the interval between two adjacent moments. Thus, the component in the direction of gravity is determined as the rate of change of force of the foot of the swinging leg in the direction of gravity, which is denoted by $\dot{f}_z$.

In another embodiment, the force acting on the foot includes the force component on the foot in the direction of gravity. After the component in the direction of gravity is obtained, the rate of change of force of the foot in the direction of gravity at the current moment can be directly calculated based on the force components on the foot in the direction of gravity at the previous moment and the current moment.

Step S130: Determine that the swinging leg has contacted the ground in response to a preset consecutive number of values of the rate of change of force being greater than a preset threshold.

Exemplarily, a caching queue may be pre-built, which is a bidirectional queue containing a preset number of elements, and is used for caching the values of the rate of change of force in the gravity direction obtained each time. It should be noted that data caching can also be performed in other manners, which are not limited here.

In one embodiment, each calculated value of the rate of change of force in the direction of gravity may be stored in the caching queue, so as to update the caching queue. In the update process, the value of the rate of change of force obtained each time is put into one end of the caching queue, and an element at the other end is deleted, so that the number of elements in the caching queue is always kept as a preset number. In other words, the calculated values of the rate of change of force are enqueued and dequeued in a first-in-first-out (FIFO) manner, such that the number of the values of the rate of change of force in the caching queue remains unchanged.

Figure 3:
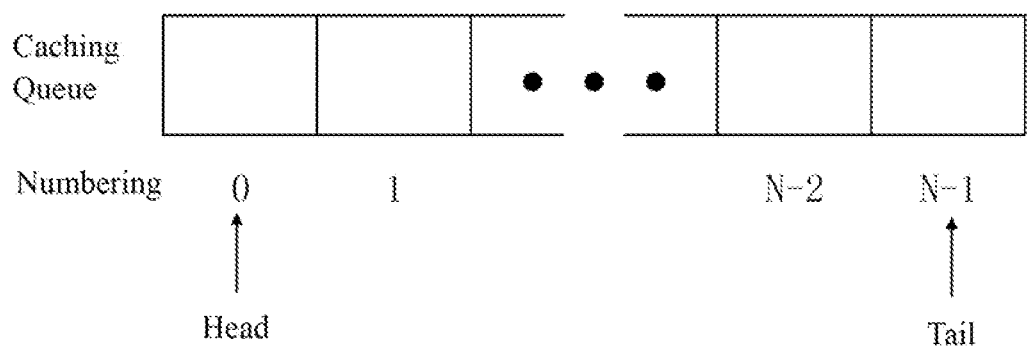
FIG. 3 is an exemplary diagram showing a caching queue.
Figure 4:
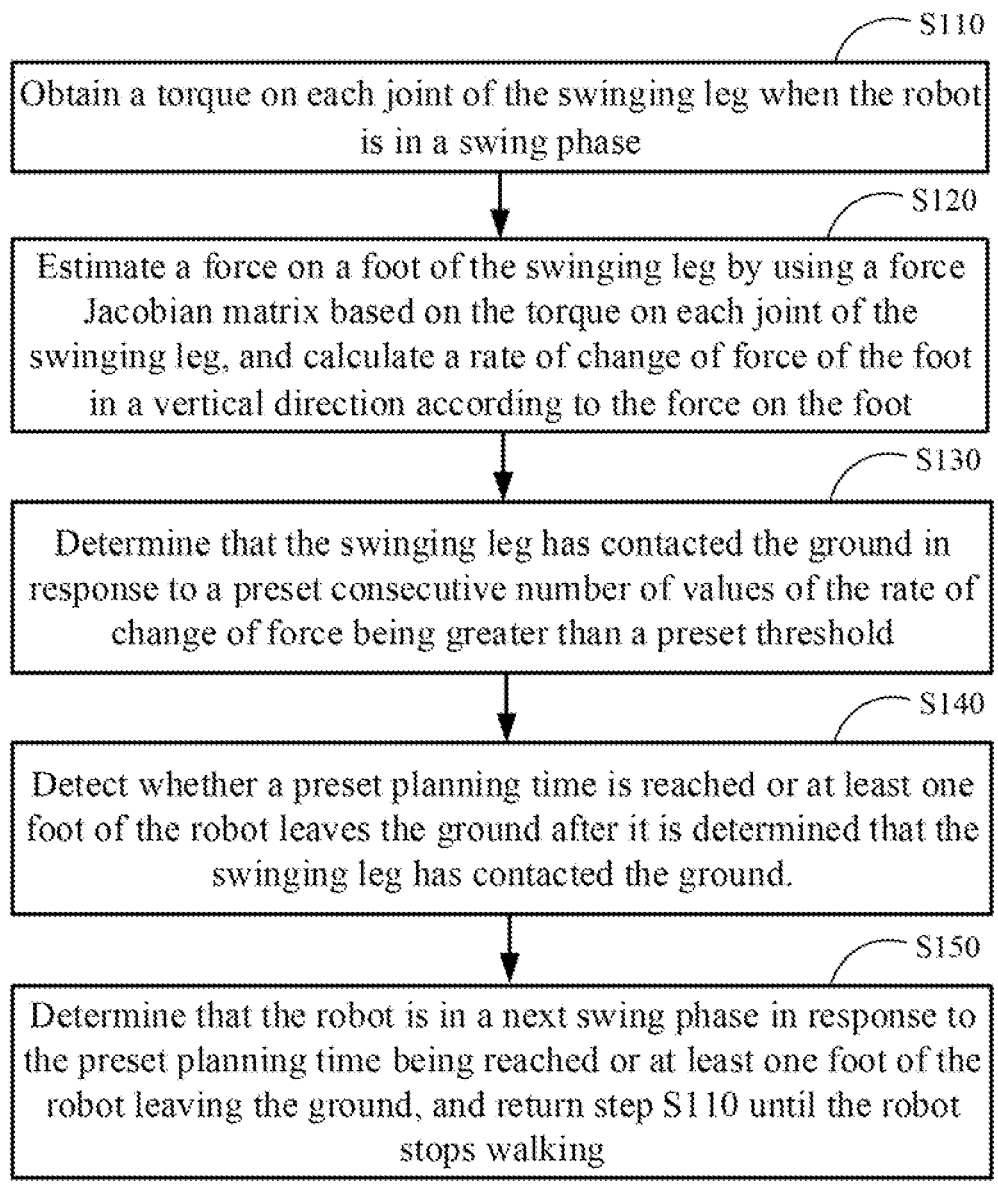
FIG. 4 is an exemplary flowchart of a foot/ground contact detection method according to another embodiment.

For example, as shown in FIG. 3, the left end of the caching queue is the head of the queue and the right end is the tail of the queue. When the number of the obtained values of the rate of change of force exceeds the number of elements in the caching queue, the latest value of the rate of change of force will be put into the head of the queue, and the value of the rate of change of force at the tail of the queue will be deleted to ensure that the number of elements in the queue is always N. N is a preset number. It should be noted that one end and the other end of the caching queue above may be the head and the tail of the queue, and they may be the tail and the head of the queue in another embodiment.

The preset number N mentioned above can be selected according to actual needs. Generally, there are cases where $N*\Delta t$ will be much smaller than the total duration of the swing phase, and $\Delta t$ is the unit duration. In addition, after the force acting on the foot and the rate of change of force in the direction of gravity at the current moment are calculated, the force acting on the foot at the current moment is updated to the force acting on the foot at the previous moment in order to calculate the rate of change of force at the next moment.

In one embodiment, a preset consecutive number of values of the rate of change of force will be compared with a preset threshold. If the preset consecutive number of values of the rate of change of force, which includes the value of the rate of change of force at the current moment, is greater than the preset threshold, it means that the touching ground determination condition is satisfied, and it can be determined that the swinging leg is in contact with the ground at the current moment. After that, all elements in the caching queue are cleared, and the current swing phase of the robot ends. In one embodiment, if at least one of the preset consecutive number of values of the rate of change of force is not greater than the preset threshold, new values of the rate of change of force will be calculated and cached until the preset consecutive number of values of the rate of change of force is greater than the preset threshold. Then, it can be determined that the swinging leg is in contact with the ground.

Generally, when a robot is walking, taking a biped robot as an example, there may be two legs that alternately enter the swing phase until the task is completed. Therefore, after the current swing phase ends, it can continue to determine whether to enter the next swing phase, and then repeat the detection steps above until the walking task ends.

Referring to FIG. 3, in one embodiment, the method may further include the following steps.

Step S140: Detect whether a preset planning time is reached or at least one foot of the robot leaves the ground after it is determined that the swinging leg has contacted the ground. For example, the preset planning time may be a pre-planned duration for the two legs of the biped robot to perform support transition, or may be a preset task waiting duration and the like.

Step S150: Determine that the robot is in a next swing phase in response to the preset planning time being reached or at least one foot of the robot leaving the ground, and return step S110 until the robot stops walking.

Exemplarily, if a new swing phase is entered, procedure returns to step S110, and repeats steps S110-S150 until the robot's walking task is completed, or a stop signal that instructs the robot to stop walking is received.

According to the method described in the embodiments above, the torques acting on the joints of the swinging leg are obtained, and the force acting on the foot of the swinging leg is estimated based on the torques acting on the joints of the swinging leg, and the rate of change in the force on the foot is monitored to determine whether the swinging leg is in contact with the ground. This method does not need to know the precise force acting on the sole of the foot, and is simple and easy to implement. In addition, the method is universal, applicable to both force-controlled and position-controlled legged robots, and has no dependence on the mass of the legs of the robot, and can be applied to legged robots of various shapes, such as robots with point-shaped feet and flat-footed robots. This method enables the legged robots to detect the foot/ground contact in a timely and efficient manner during the walking process, and can provide necessary information for the planning and control of the upper layer, thereby ensuring the stability and robustness of the robots.

Figure 5:
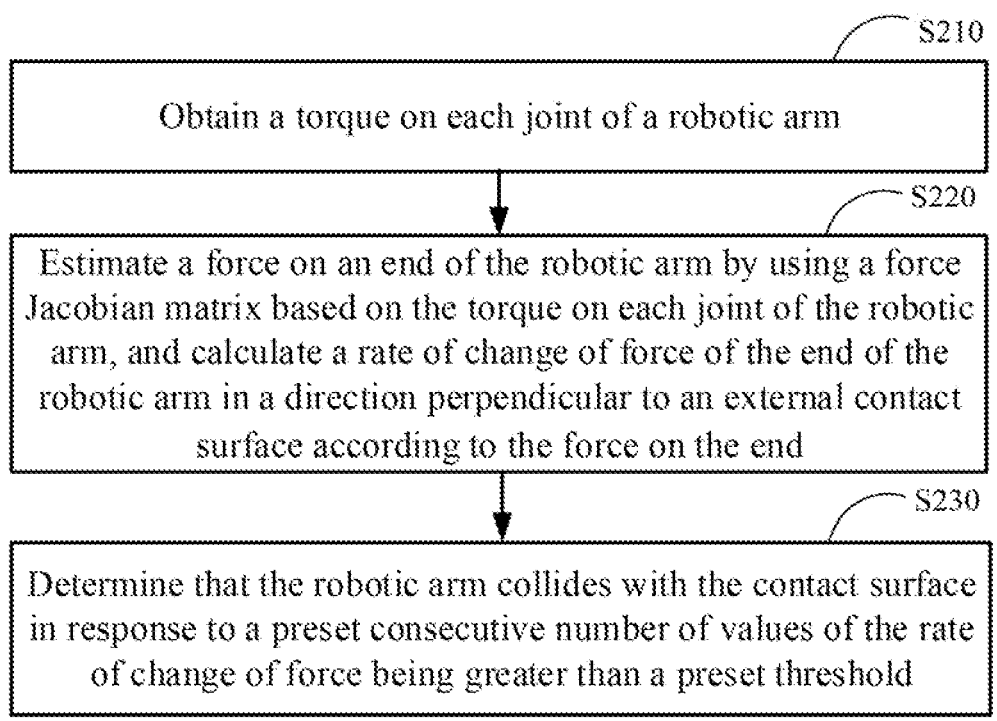
FIG. 5 is an exemplary flowchart of a collision detection method according to one embodiment.

FIG. 5 shows a collision detection method of a robotic arm, which can be applied to various industrial robots with robotic arms for collision detection between the robotic arm and the external environment. In one embodiment, the method may include the following steps.

Step S210: Obtain a torque on each joint of a robotic arm.

In one embodiment, if each joint of the robotic arm is equipped with a torque sensor, the torque acting on each joint can be obtained through the torque sensor on each joint. In another embodiment, if each joint of the robotic arm is not equipped with a torque sensor, the torque acting on the corresponding joint can be estimated according to a corresponding equation based on the current of the drive motor of the corresponding joint. The equation for estimating the torque is as follows: $\tau_i = r_i * k_i * I_i$, where $\tau_i$ represents the torque acting on the i-th joint of the robotic arm, $r_i$ represents a reduction ratio of the i-th joint reducer, $k_i$ and $I_i$ represent a torque coefficient and a current of the drive motor for the i-th joint, respectively.

Step S220: Estimate a force on an end of the robotic arm by using a force Jacobian matrix based on the torque on each joint of the robotic arm, and calculate a rate of change of force of the end of the robotic arm in a direction perpendicular to an external contact surface according to the force on the end.

Exemplarily, the force on the end of the robotic arm in the Cartesian space can be roughly estimated by means of static Jacobian matrix mapping. For the specific calculation of the force acting on the end of the robotic arm, reference may be made to step S120 above.

After the force acting on the end of the robotic arm is calculated, the rate of change of force of the end of the robotic arm in the direction perpendicular to the external contact surface will be calculated. The external contact surface refers to an external object that the robotic arm contacts with. For example, for a grinding robotic arm, the external contact surface is the surface of the object to be ground.

Step S230: Determine that the robotic arm collides with the contact surface in response to a preset consecutive number of values of the rate of change of force being greater than a preset threshold.

Exemplarily, when the preset consecutive number of values of the rate of change of force is greater than the preset threshold, it can be determined that the robotic arm has collided with the external contact surface at the current moment. Otherwise, it can be determined that there is no collision. It can continue to calculate the rate of change of force at the next moment until a preset consecutive number of values of the rate of change of force is greater than a preset threshold. Then, it can be determined that the robotic arm has collided with the external contact surface. In one embodiment, the caching of the values of the rate of change of force may be realized by means of a caching queue, and reference may be made to the step S130 above.

The difference between the collision detection method and the method for foot/ground contact detection is that the application objects are different. The collision detection method is applicable in a robotic arm whose end position in contact with the external environment is known. For example, the collision detection method can be applied in an industrial grinding robot with a robotic arm. The method for foot/ground contact detection is applicable in a legged robot. In addition, some technical contents related to the method for foot/ground contact detection are also applicable to the collision detection method, which will not be repeated here.

According to the collision detection method of the robotic arm, the torque acting on the joints of the robotic arm are first obtained, the force acting on the end of the robotic arm is then estimated based on the torque acting on each joint of the robotic arm, and the rate of change of force of the end is monitored to determine whether the robotic arm collides with the external contact surface. As a result, efficient collision detection can be realized for subsequent task operations.

Referring to FIG. 6, in one embodiment, corresponding to the method for detecting the contact of a swinging leg of a robot with the ground, a foot/ground contact detection device may include a torque acquisition module 110, a force estimation module 120, and a determining module 130. The torque acquisition module 110 is to obtain a torque on each joint of the swinging leg when the robot is in a swing phase. The force estimation module 120 is to estimate a force on a foot of the swinging leg by using a force Jacobian matrix based on the torque on each joint of the swinging leg, and calculate a rate of change of force of the foot in a vertical direction according to the force on the foot. The determining module 130 is to determine that the swinging leg has contacted the ground in response to a preset consecutive number of values of the rate of change of force being greater than a preset threshold.

It should be noted that the basic principles and technical effects of the foot/ground contact detection device are the same as the aforementioned method for detecting the contact of a swinging leg of a robot with the ground. For a brief description, for parts not mentioned in this device embodiment, reference can be made to corresponding description in the method embodiments.

Figure 7:
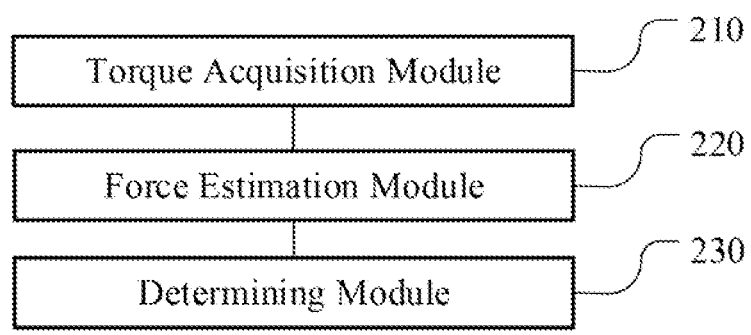
FIG. 7 is schematic block diagram of a collision detection device according to one embodiment.

Referring to FIG. 7, in one embodiment, corresponding to the collision detection method, a collision detection device may include a torque acquisition module 210, a force estimation module 220, and a determining module 230. The torque acquisition module 210 is to obtain a torque on each joint of a robotic arm. The force estimation module 220 is to estimate a force on an end of the robotic arm by using a force Jacobian matrix based on the torque on each joint of the robotic arm, and calculate a rate of change of force of the end of the robotic arm in a direction perpendicular to an external contact surface according to the force on the end. The determining module 230 is to determine that the robotic arm collides with the contact surface in response to a preset consecutive number of values of the rate of change of force being greater than a preset threshold.

It should be noted that the basic principles and technical effects of the collision detection device are the same as the aforementioned collision detection method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

In one embodiment, the robot 10 may be, but is not limited to, a legged robot including point-shaped feet or flat feet. The number of the legs of the legged robot is not limited, for example, it may be a humanoid robot, or a robot with three or more legs. For the swinging legs of these legged robots, the foot/ground contact detection method above can be used for foot/ground contact detection.

In another embodiment, the robot can also be an industrial robot whose end position in contact with the external environment is known, such as a welding robot, a grinding robot, etc. Exemplarily, the industrial robot has at least one robotic arm. For the robotic arms, the collision detection method above can be used for collision detection.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the pan contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module I unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for detecting contact of a swinging leg of a robot with ground, wherein the robot comprises: a processor and at least two legs with feet electrically coupled to the processor, and the method comprises:
   a) controlling, by the processor, the robot to walk, and obtaining a torque on each joint of the swinging leg when the robot is in a swing phase;
   b) estimating, by the processor, a force on a foot of the swinging leg by using a force Jacobian matrix based on the torque on each joint of the swinging leg, and calculating a rate of change of force of the foot in a vertical direction according to the force on the foot;
   c) determining, by the processor, that the swinging leg has contacted the ground in response to a preset consecutive number of values of the rate of change of force being greater than a preset threshold; and
   d) controlling, by the processor, at least one foot of the robot to leave the ground in response to determining that the swinging leg has contacted the ground.

2. The method of claim 1, further comprising:
   detecting, by the processor, whether a preset planning time is reached or the at least one foot of the robot leaves the ground after it is determined that the swinging leg has contacted the ground; and
   determining, by the processor, that the robot is in a next swing phase in response to the preset planning time being reached or at least one foot of the robot leaving the ground, and returning to a) until the robot stops walking.

3. The method of claim 1, wherein the torque on each joint of the swinging leg is obtained through a torque sensor on each joint of the swinging leg.

4. The method of claim 1, wherein obtaining the torque on each joint of the swinging leg comprises:
   estimating the torque on each joint of the swinging leg based on a current of a drive motor corresponding to each joint of the swinging leg according to the following equation: $\tau_i = r_i * k_i * I_i$, where $\tau_i$ represents the torque acting on an i-th joint of the swinging leg, $r_i$ represents a reduction ratio of an i-th joint reducer, $k_i$ and $I_i$ represent a torque coefficient and a current of the drive motor for the i-th joint, respectively.

5. The method of claim 3, wherein estimating the force on the foot of the swinging leg by using the Jacobian matrix based on the torque on each joint of the swinging leg comprises:
   calculating the force Jacobian matrix of the swinging leg through a velocity Jacobian matrix of the swinging leg; and
   calculating the force on the foot of the swinging leg using the force Jacobian matrix and the torque acting on each joint of the swinging leg.

6. The method of claim 1, wherein calculating the rate of change of force of the foot in the vertical direction according to the force on the foot comprises:
   calculating a rate of change in a resultant force of the foot of the swinging leg at a current moment based on the force on the foot at a previous moment and the current moment, and determining a component of the rate of change in the resultant force in the vertical direction as the rate of change of force of the foot in the vertical direction; or
   calculating the rate of change of force of the foot in the vertical direction at the current moment based on components of the force on the foot in the vertical direction at the previous moment and the current moment.

7. The method of claim 1, wherein the values of the rate of change of force are operated as follows:
   caching each calculated value of the rate of change of force in a caching queue, wherein the calculated values of the rate of change of force are enqueued and dequeued in a first-in-first-out (FIFO) manner, such that a number of the values of the rate of change of force in the caching queue remains unchanged.

8. A legged robot comprising:
one or more processors;
at least two legs with feet electrically coupled to the one or more processors; and
a memory coupled to the one or more processors, the memory storing programs that, when executed by the one or more processors, cause performance of operations comprising:
a) controlling the legged robot to walk, and obtaining a torque on each joint of a swinging leg of the legged robot when the legged robot is in a swing phase;
b) estimating a force on a foot of the swinging leg by using a force Jacobian matrix based on the torque on each joint of the swinging leg, and calculating a rate of change of force of the foot in a vertical direction according to the force on the foot;
c) determining that the swinging leg has contacted the ground in response to a preset consecutive number of values of the rate of change of force being greater than a preset threshold; and
d) controlling at least one foot of the legged robot to leave the ground in response to determining that the swinging leg has contacted the ground.

9. The legged robot of claim 8, wherein the operations further comprise:
detecting whether a preset planning time is reached or the at least one foot of the legged robot leaves the ground after it is determined that the swinging leg has contacted the ground; and
determining that the legged robot is in a next swing phase in response to the preset planning time being reached or at least one foot of the legged robot leaving the ground, and returning to a) until the legged robot stops walking.

10. The legged robot of claim 8, wherein the torque on each joint of the swinging leg is obtained through a torque sensor on each joint of the swinging leg.

11. The legged robot of claim 8, wherein obtaining the torque on each joint of the swinging leg comprises:
estimating the torque on each joint of the swinging leg based on a current of a drive motor corresponding to each joint of the swinging leg according to the following equation: $\tau_i = r_i * k_i * I_i$, where $\tau_i$ represents the torque acting on an i-th joint of the swinging leg, $r_i$ represents a reduction ratio of an i-th joint reducer, $k_i$ and $I_i$ represent a torque coefficient and a current of the drive motor for the i-th joint, respectively.

12. The legged robot of claim 10, wherein estimating the force on the foot of the swinging leg by using the Jacobian matrix based on the torque on each joint of the swinging leg comprises:
calculating the force Jacobian matrix of the swinging leg through a velocity Jacobian matrix of the swinging leg; and
calculating the force on the foot of the swinging leg using the force Jacobian matrix and the torque acting on each joint of the swinging leg.

13. The legged robot of claim 8, wherein calculating the rate of change of force of the foot in the vertical direction according to the force on the foot comprises:
calculating a rate of change in a resultant force of the foot of the swinging leg at a current moment based on the force on the foot at a previous moment and the current moment, and determining a component of the rate of change in the resultant force in the vertical direction as the rate of change of force of the foot in the vertical direction; or
calculating the rate of change of force of the foot in the vertical direction at the current moment based on components of the force on the foot in the vertical direction at the previous moment and the current moment.

14. The legged robot of claim 8, wherein the values of the rate of change of force are operated as follows:
caching each calculated value of the rate of change of force in a caching queue, wherein the calculated values of the rate of change of force are enqueued and dequeued in a first-in-first-out (FIFO) manner, such that a number of the values of the rate of change of force in the caching queue remains unchanged.

15. A non-transitory computer-readable storage medium storing instructions that, when executed by at least one processor of a legged robot, cause the at least one processor to perform a method, the method comprising:
a) controlling the legged robot to walk, and obtaining a torque on each joint of a swinging leg of the legged robot when the legged robot is in a swing phase;
b) estimating a force on a foot of the swinging leg by using a force Jacobian matrix based on the torque on each joint of the swinging leg, and calculating a rate of change of force of the foot in a vertical direction according to the force on the foot;
c) determining that the swinging leg has contacted the ground in response to a preset consecutive number of values of the rate of change of force being greater than a preset threshold; and
d) controlling at least one foot of the legged robot to leave the ground in response to determining that the swinging leg has contacted the ground.

16. The non-transitory computer-readable storage medium of claim 15, wherein the method further comprises:
detecting whether a preset planning time is reached or the at least one foot of the legged robot leaves the ground after it is determined that the swinging leg has contacted the ground; and
determining that the legged robot is in a next swing phase in response to the preset planning time being reached or at least one foot of the legged robot leaving the ground, and returning to a) until the legged robot stops walking.

17. The non-transitory computer-readable storage medium of claim 15, wherein the torque on each joint of the swinging leg is obtained through a torque sensor on each joint of the swinging leg.

18. The non-transitory computer-readable storage medium of claim 15, wherein obtaining the torque on each joint of the swinging leg comprises:
estimating the torque on each joint of the swinging leg based on a current of a drive motor corresponding to each joint of the swinging leg according to the following equation: $\tau_i = r_i * k_i * I_i$, where $\tau_i$ represents the torque acting on an i-th joint of the swinging leg, $r_i$ represents a reduction ratio of an i-th joint reducer, $k_i$ and $I_i$ represent a torque coefficient and a current of the drive motor for the i-th joint, respectively.

19. The non-transitory computer-readable storage medium of claim 17, wherein estimating the force on the foot of the swinging leg by using the Jacobian matrix based on the torque on each joint of the swinging leg comprises:
calculating the force Jacobian matrix of the swinging leg through a velocity Jacobian matrix of the swinging leg; and calculating the force on the foot of the swinging leg using the force Jacobian matrix and the torque acting on each joint of the swinging leg.

20. The non-transitory computer-readable storage medium of claim 15, wherein calculating the rate of change of force of the foot in the vertical direction according to the force on the foot comprises:
   calculating a rate of change in a resultant force of the foot of the swinging leg at a current moment based on the force on the foot at a previous moment and the current moment, and determining a component of the rate of change in the resultant force in the vertical direction as the rate of change of force of the foot in the vertical direction; or
   calculating the rate of change of force of the foot in the vertical direction at the current moment based on components of the force on the foot in the vertical direction at the previous moment and the current moment.

* * * * *